(12) United States Patent
Fisher et al.

(10) Patent No.: US 6,621,451 B1
(45) Date of Patent: Sep. 16, 2003

(54) USE OF TEXTURE MEMORY FOR WX SCAN CONVERSION

(75) Inventors: Paul A. Fisher, Scottsdale, AZ (US); William R. Hancock, Phoenix, AZ (US); Susan L. McCullough, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/218,299

(22) Filed: Aug. 13, 2002

(51) Int. Cl.[7] .............................. G01S 7/02; G01S 7/04; H04N 7/01
(52) U.S. Cl. ...................... 342/185; 342/175; 342/176; 342/181; 342/195
(58) Field of Search ................... 342/175–186, 342/195; 348/441–459; 367/7–11, 36, 37, 68–74, 87, 99, 107, 113

(56) References Cited

U.S. PATENT DOCUMENTS

| | | | | |
|---|---|---|---|---|
| 3,633,173 A | * | 1/1972 | Edge | 342/185 |
| 3,680,103 A | * | 7/1972 | Houser et al. | 342/185 |
| 3,774,202 A | * | 11/1973 | Nolette | 342/185 |
| 3,797,014 A | * | 3/1974 | Tompkins et al. | 342/185 |
| 3,898,650 A | * | 8/1975 | Jensen | 342/185 |
| 3,904,817 A | * | 9/1975 | Hoffman et al. | 342/185 |
| 4,214,269 A | * | 7/1980 | Parker et al. | 342/185 |
| 4,845,501 A | * | 7/1989 | Pease et al. | 342/185 |
| 5,049,886 A | * | 9/1991 | Seitz et al. | 342/185 |
| 5,097,268 A | * | 3/1992 | Bauer et al. | 342/185 |
| 5,455,591 A | * | 10/1995 | Hui | 342/185 |
| 5,554,992 A | * | 9/1996 | Toth et al. | 342/185 |
| 5,640,165 A | * | 6/1997 | Hui et al. | 342/185 |
| 5,923,285 A | * | 7/1999 | Andrusiak et al. | 342/177 |
| 6,211,814 B1 | * | 4/2001 | Benjamin et al. | 342/185 |

* cited by examiner

Primary Examiner—Bernarr E. Gregory (57) ABSTRACT

A radar display system (10) according to the present invention generates textured radar display data by utilizing a direct memory access receiver (12) to receive radially scanned radar data, to convert the radially scanned radar data into range bin data sets, and to store the range bin data sets. A graphics renderer (18) stores the set of range bin data sets in a texture memory (20) as a plurality of rectangular textures, and bit maps the rectangular textures to a series of display triangles in a frame buffer (22). The graphics renderer (18) colors the display triangles in accordance with the rectangular textures by performing a bi-linear interpolation of the color and warps the display triangles in accordance with the size of a display (24).

20 Claims, 7 Drawing Sheets

USE OF TEXTURE MEMORY FOR WX SCAN CONVERSION

BACKGROUND OF THE INVENTION

1. Field of the Invention

The present invention relates generally to radar display systems and, more particularly, to a system for displaying radar images with other symbology.

2. Description of the Related Art

A conventional radar display system utilizes various hardware components to generate a colored radar display image. A receiver receives radar energy from a radar antenna and converts the radar energy into radial intensity values from one radial (angle) of the radar antenna during a radar scan in polar coordinate format. Successive radials make up a complete scan. In order to display these radial intensity values, a scan converter converts the radial intensity values from polar coordinate format to Cartesian coordinate format, and converts each of the radial intensity values into color information. The scan converter stores the values and the color information to permit display of a complete image at one time despite the slow scan of the radar antenna. A scaler subsequently compresses or expands the radial information to the desired display size. A symbology merger, which, along with the scan converter and the scalar can be a separate ASIC or FPGA device, merges the RGB radar colors with symbology of the display to generate a complete display image.

However, the above-discussed conventional radar display system has a high associated cost due to the various hardware components required, and fails to take advantage of hardware and software capabilities of the general purpose graphics hardware included in most computer systems. Also, the cost of dedicated hardware leads to compromises in the quality of the displayed images. For example, repeating pixels or lines is an inexpensive way of scaling the image, but produces blocky images.

Therefore, what is needed is a system that can generate quality radar images while using a minimum of dedicated hardware beyond the general-purpose graphics hardware used to generate the additional symbology.

SUMMARY OF THE INVENTION

In view of the above, the present invention provides a display system including a main memory and a receiver for receiving radially scanned radar data in a defined format, for converting the radially scanned radar data into range bin data sets and for writing the range bin data sets into the main memory. A graphics renderer maps these range bin data sets onto display primitives, generating a textured bit mapped image of the range bin data sets. A processor loads the range bin data sets from the main memory into the graphics renderer and controls the operation of the graphics renderer.

Through the above configuration, the radar display system of the present invention reduces the amount of hardware, and therefore the cost, of providing radar images on a display, as the scan conversion process is handled by hardware that is already part of commercially available general-purpose graphics hardware rather than by more expensive system specific hardware components.

BRIEF DESCRIPTION OF THE DRAWINGS

Objects and advantages of the present invention will be more readily apparent from the following detailed description of the preferred embodiments thereof when taken together with the accompanying drawings in which.

BRIEF DESCRIPTION OF THE PREFERRED EMBODIMENTS

Figure 1:
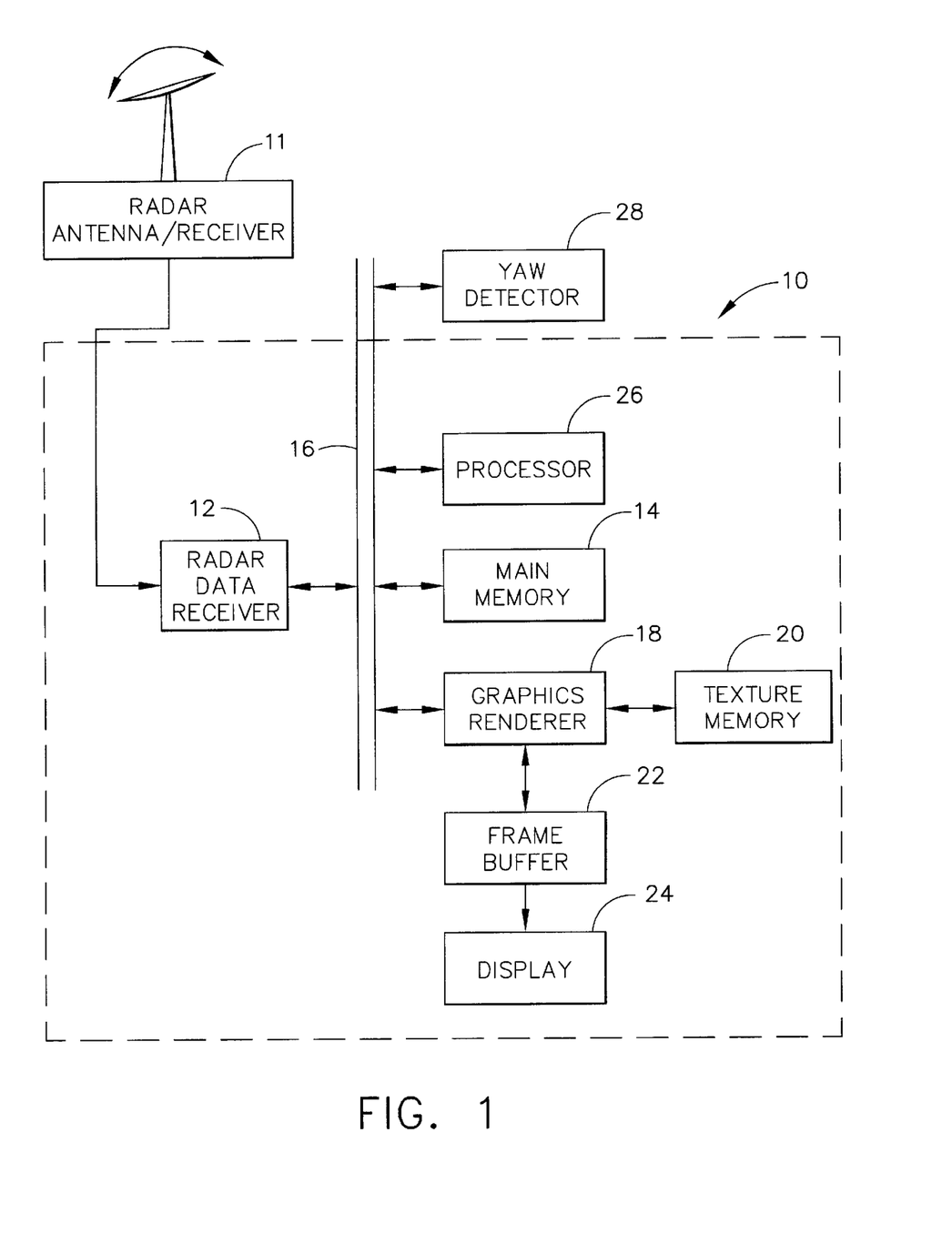
FIG. 1 is an exemplary view of a preferred embodiment of the radar display system of the present invention.

Referring now to the drawings in which like numerals reference like parts, FIG. 1 shows a display system 10 of the present invention that utilizes texture memory for radar scan conversion. The display system 10 is implemented within, for example, an aircraft navigational display system and is in electronic communication with other components of the navigational display system, such as a compass or a yaw detector 28. However, the display system can be implemented within any radar system in which a scaled color display output is desired.

The radar display system 10 includes several hardware and software components as follows. A radar antenna and receiver/processor (radar antenna/receiver) 11 that is part of, for example, an aircraft weather radar system is in communication with a radar data receiver 12. A main memory 14 is in communication with the radar data receiver 12 via a system bus 16. A graphics renderer 18 is in communication with a texture memory 20, a frame buffer 22 and the system bus 16. The frame buffer 22 is in communication with a display output 24. A processor 26 controls the main memory 14, the graphics renderer 18 and the frame buffer 22 via the system bus 16. The structure and function of each of the abovementioned components of the display system 10 will be discussed in detail below.

As will be understood by those skilled in the art, the radar antenna/receiver 11 sweeps an area and returns radially scanned radar data (radar data) including intensities of respective radar detected events (radar returns) at specific radials within the sweep in a specific format. The specific format of the radar data can be, for example, WXPD format or ARINC 708 standard format. In the ARINC 708 format the radar data includes a header representing the radar antenna angle and a data portion representing the intensity values associated with the radar antenna angle in the header. In the WXPD format the radar data includes intensity values and an "Increment X" and "Increment Y" bit for each intensity value. The intensities of the radar returns can be indicative of, for example, the distance between the aircraft and the surface of the Earth, the distance between the aircraft and another aircraft, or of weather.

Figure 4A:
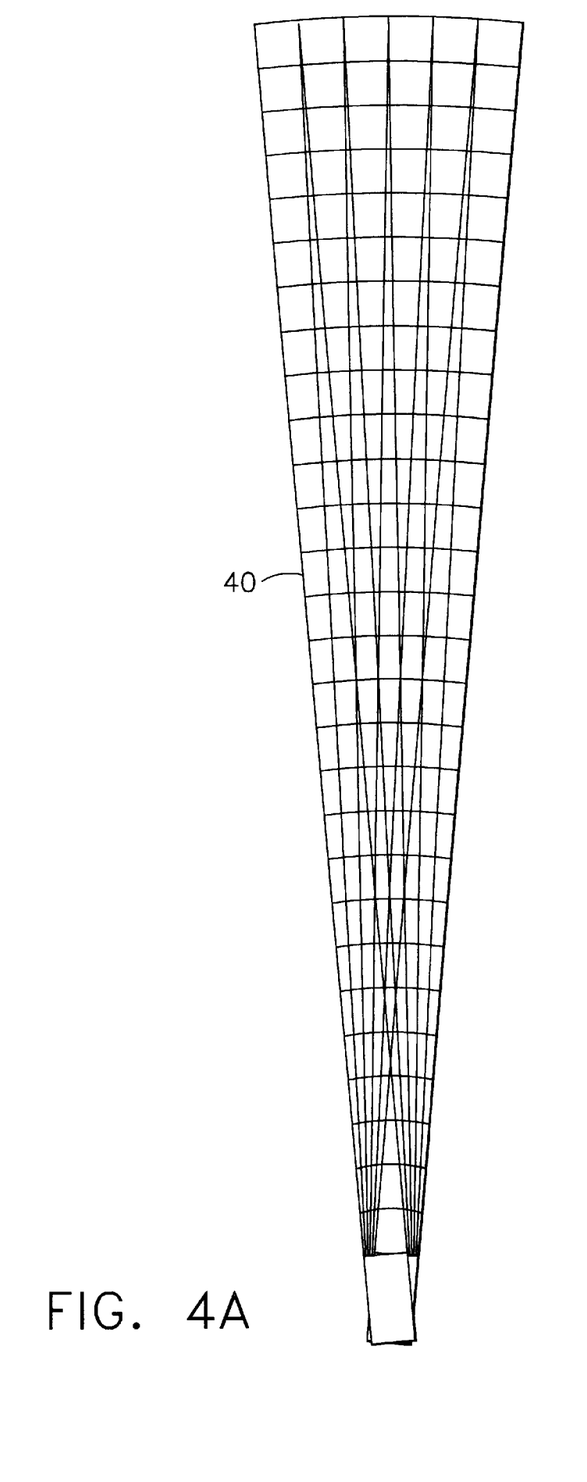
FIGS. 4A–4E illustrate the conversion of radial radar data into color pixel display data.

The spatial relationship of an exemplary partial radar scan 40 of the radar antenna/receiver 11 is shown in FIG. 4A. The radar antenna/receiver 11 is located at the base of the partial radar scan 40. Individual radar returns (range bins) are represented within one square. Each radial is represented by one of the overlapping columns of squares. The successive columns represent the successive radials and each column is at a slightly different angle. The range bins close to the antenna overlap. However, these range bins will contain redundant radar returns because of their proximity within the same area of space. In a typical implementation, a 120° radar scan will include 256–512 range bins per radial and approximately 512 radials.

Referring back to FIG. 1, the radar data receiver 12, which may be, for example, an FPGA having direct memory access (DMA) with the main memory 14, is for receiving the radar data in the specific format, for converting the radar data into range bin data sets (one for each radial) and for writing the range bin data sets in the main memory 14. Each range bin data set consists of data (range bins) representative of the intensity of each of the radar returns at increasing distances from the radar antenna 11. The radar data receiver 12 determines the angle of the radar antenna/receiver 11 for each range bin data set and writes the range bin data sets in main memory 14 with their associated angles. If the radar data is in the WXPD format, the angle is determined by counting the Increment X and Increment Y bits, respectively, and calculating the inverse tangent of the ratio of the two bits. The processor 26 may alternatively perform this calculation and the subsequent writing.

The radar data receiver 12 is preset for receiving WXPD data if the radar antenna/receiver 11 provides radar data in WXPD format. After receiving the WXPD radar data, the radar data receiver 12 counts the number of X and Y increments in a range bin data set (individually) to determine the total rise and run for that particular radial. These counts along with the respective radial are stored in the main memory 14. The radar data receiver 12 adds a one-bit pad to each of the three bit intensity values and writes it in main memory 14 so that each intensity value is in the preferred format of a texture pixel.

The radar data receiver 12 is preset for receiving ARINC 708 data if the radar antenna/receiver 11 provides radar data in ARINC 708 format. The angle is taken from the header and written with the range bin data set in the main memory 14. The radar data receiver 12 adds a one-bit pad to each of the three bit intensity values and writes it in main memory 14 so that each intensity value is in the preferred format of a texture pixel.

The system bus 16 can be, for example, a peripheral component interconnect (PCI) bus that enables various components connected thereto to communicate with one another via a bus-specific protocol. However, any system bus capable of supporting implementation of the radar display system of the present invention may be utilized. According to one embodiment of the present invention, the system bus 16 may be a system bus of an aircraft navigational system 10 rather than a bus implemented specifically to enable various components of the radar display system of the present invention to communicate with one another. In the preferred embodiment the system bus 16 will have the DMA capability for permitting the radar receiver 12 and the graphics renderer to transfer data to or from main memory 14 without having to move the data through the processor 26.

Figure 2:
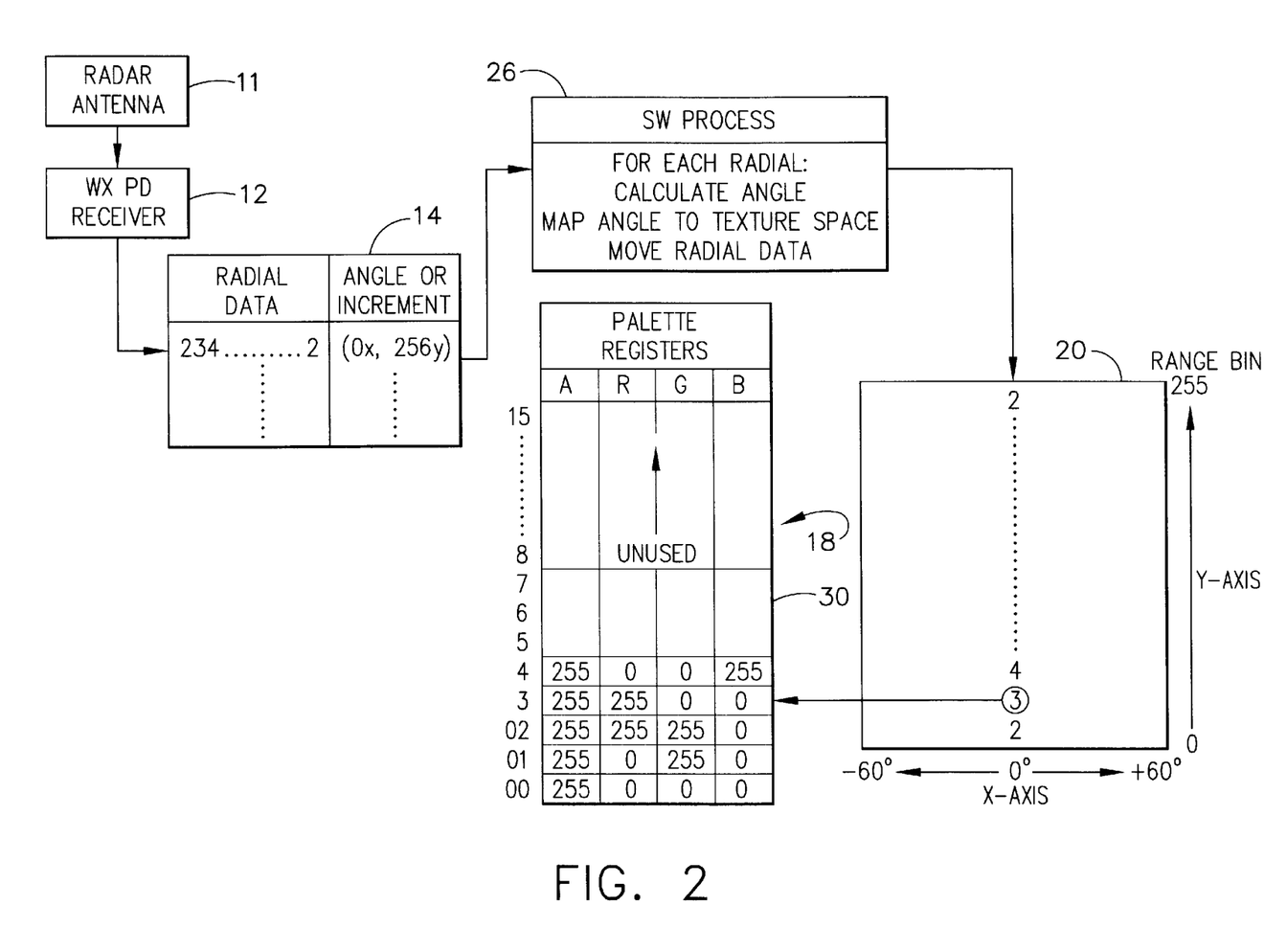
FIG. 2 is a diagram of certain components of the radar display system shown in FIG. 1 illustrating the core process by which the graphics renderer in the radar display system of the present invention stores radial radar data in texture memory with respect to WX PD format radar data.
Figure 3:
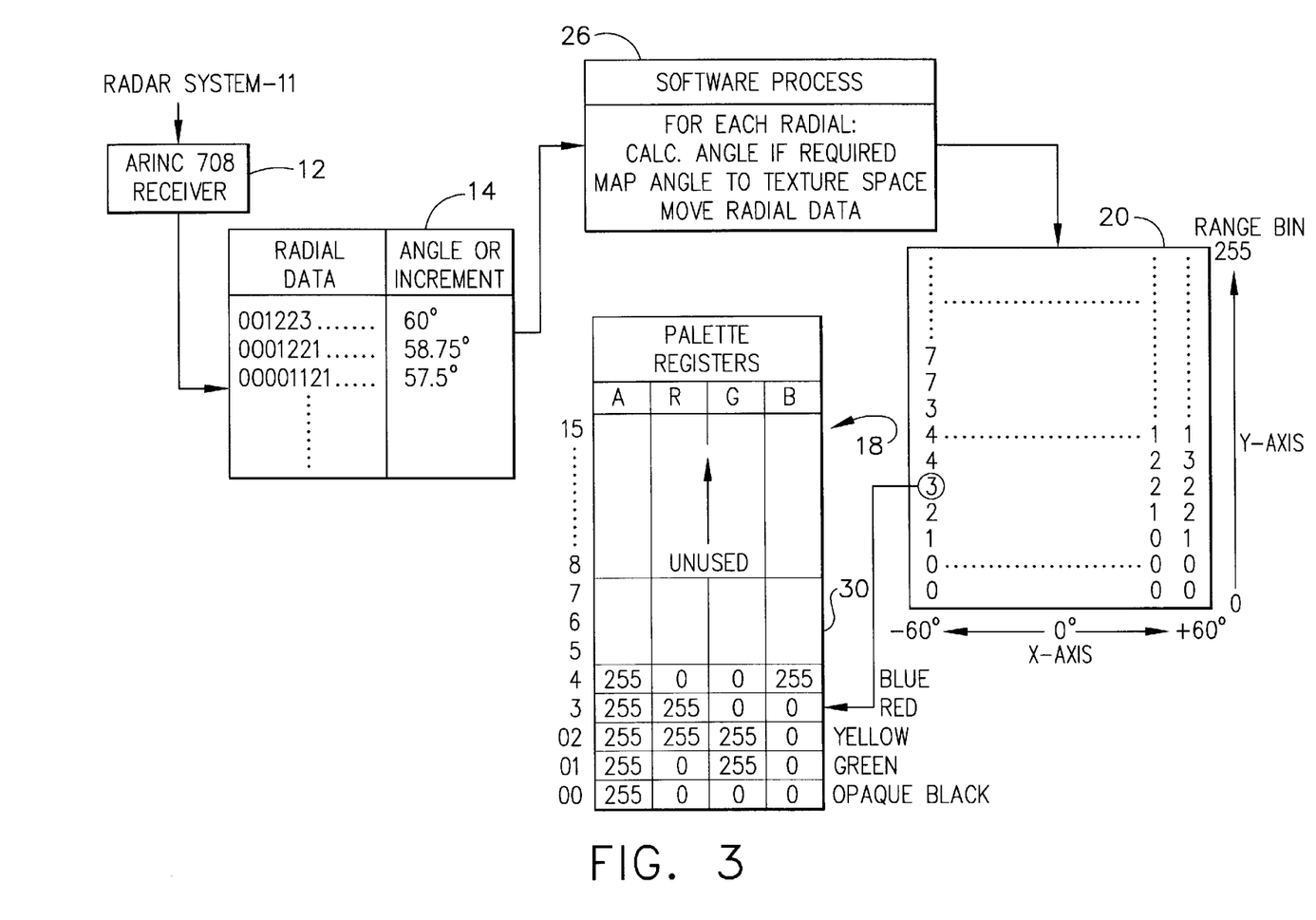
FIG. 3 is a diagram illustrating the core process with respect to ARINC 708 format radar data.

The graphics renderer 18 is for generating warped textured display polygons of the range bin data sets upon being commanded by the processor 26. The graphics renderer 18 is preferably a hardware component included in graphics engines in conventional display systems. As shown in FIGS. 2–3, the graphics renderer 18 preferably includes a plurality of palette registers 30. As will be discussed more specifically below, the graphics renderer 18 is for loading the range bin data sets from the main memory 14 via the system bus 16 into the texture memory 20 as rectangular textures containing the intensity of the radar return for each range bin in each of the range bin data sets, and for generating display polygons that have rectangular radar textures mapped to them. The mapping preferably includes converting the radar intensity to color using the palette registers 30. The graphics renderer 18 generates polygons as a plurality of picture elements (or pixels) and may be, for example, an Evans and Sutherland Real Image 4000 type renderer.

The frame buffer 22 is for receiving the pixels comprising the polygons from the graphics renderer 18. Specifically, the pixels generated by the graphics renderer 18 are outputted to locations in the frame buffer 22 corresponding to the locations of the pixel on display image.

The display 24 receives the image from the frame buffer 22 and converts it to a form visible to the observer.

The processor 26 is for controlling the various components of the display system 10 that are connected to the system bus 16 and for controlling the non-radar display system tasks. The processor 26 is also for controlling the movement of the range bin data sets from main memory 14 to the correct locations in texture memory 20. If required by the format (such as WXPD), the processor 26 is also for calculating the angle of each of the range bin data sets from the increment counts stored within the radar data. The processor 26 periodically checks the main memory 14 to see if any range bin data sets have been stored. If any such range bin data sets are found, the processor 26 will calculate the radial angle (the number of degrees) for each radar return by calculating the $\tan^{-1}$ of the run and rise location of each radar return (for WXPD radar data) or retrieve the angle stored with each data set (for 708 ARINC radar data). The processor 26 will then generate the commands required for the graphics renderer 18 to move the data to the correct location(s) based on that angle in the texture memory 20. The mapping from angle to location in the texture memory 20 will depend on the characteristics of the radar antenna/receiver 11. The processor 26 also generates commands which load tables that associate the intensities stored in the range bins with specific colors into the graphics renderer 18.

Operation of the display system 10 will be discussed with respect to the generation of display images in general. The processor 26, using various inputs (not shown) generates commands for the graphics renderer 18. These commands are stored in the main memory 14 or sent directly to the graphics renderer 18. The graphics render 18 receives these commands from the processor 26, or accesses them in the main memory 14 via direct memory access in order to render an image in the frame buffer 22. The commands include, for example, commands to store bit-mapped images (textures) of various sizes in the texture memory 20. At a later time the graphics renderer 18 may execute commands to render a triangle in the frame buffer 22 using a bit-mapped image to color the triangle instead of the normal solid or shaded color by specifying the portion of the bitmap in texture memory 20 that is to overlay the triangle to be rendered. The graphics renderer 18 determines the color of each pixel of the triangle to be rendered using the area of the bitmapped texture specified.

Referring to FIGS. 2–4E, operation of the display system 10 of the present invention will now be discussed. In FIGS. 2 and 3, the exemplary radar scan area is an area defined by a 120° horizontal sweep of the radar antenna 11 (60° on either side of the nose of the aircraft). This scan area is divided into 512 range bin data sets (or radials), with each of the 512 range bin data sets having 256 return values represented by 256 range bins. An exemplary portion of a radar scan area is shown in FIG. 4A. Each square represents one range bin, and one radial consists of the range bins extending out from the antenna in one column. The intensity value in each range bin represents the intensity of the radar return in each bin and typically has eight possible values. The radar antenna/receiver 11 encodes this information in either the WXPD or ARINC 708 format as discussed above and transmits it to the display system 10.

Referring to FIG. 2, the radar data receiver 12 in WXPD mode (WX receiver) receives WXPD format radar data for radial 0 consisting of [(0,1,2), (0,1,3), (0,1,4)...(0,1,2)] (x inc., y inc., intensity) from the radar antenna/receiver 11. The WX receiver 12 subsequently stores 2,3,4...2 and the count of the x inc. bits (0) and y inc. bits (256) in main memory 14. The 0x, 256y, are representative of a radial 0°, or a radial received with the radar antenna/receiver 11 pointing straight ahead of the aircraft.

The processor 26 checks and determines that the above range bin data set has been stored in the main memory 14. The processor 26 then calculates a radial angle of 0° for this radar return by calculating the $\tan^{-1}$ of the run (256y) and rise (0x) of the radial. The processor 26 will then generate the commands required for the graphics renderer 18 to move the range bin data set from main memory 14 into texture memory 20 at an x-axis position of 0° and each element of the range bin data set in the y-axis position in accordance with the order each of the intensity values was received in the texture memory 20. The processor 20 preferably repeats this process for other radials in main memory 14, and in accordance with one embodiment of the present invention, the processor 20 repeats this process for substantially all or all the radials in memory 14. The processor 26 loads the pallete register pointer table for associating the intensity values stored in the range bins with specific colors in the graphics renderer 18. As a result, the texture pixels (the 3 bit intensities padded to 4 bits) become four bit pointers to one of the sixteen palette registers within the palette registers 30. The graphics renderer 18 subsequently moves the range bin data sets into texture memory 20 as rectangular textures based upon the radial number and the radar return intensity values.

Referring to FIG. 3, the radar receiver 12 in ARINC 708 mode (ARINC receiver) receives ARINC format radar data for a radial consisting of [(0, 0, 1, 2,)...] (256 values with a header with an angle of 60°) from the radar antenna/receiver 11. The ARINC receiver 12 associates intensity values 0, 0, 1, 2... with this angle of 60° and subsequently stores this data in the main memory 14. The processor 26 checks and determines that the above range bin data set has been stored in the main memory 14 and generates the commands required for the graphics renderer 18 to move the range bin data set from main memory 14 into texture memory 20 at an x-axis position of 60° and a y-axis position in accordance with each of the intensity values in the texture memory 20. A rectangular texture is generated within the texture memory 20 for this range bin data set as discussed above with respect to FIG. 2.

Figure 4B:
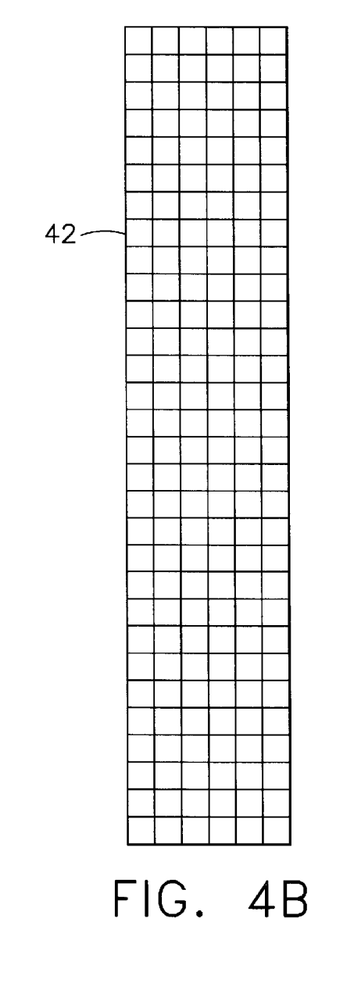
Figure 4C:
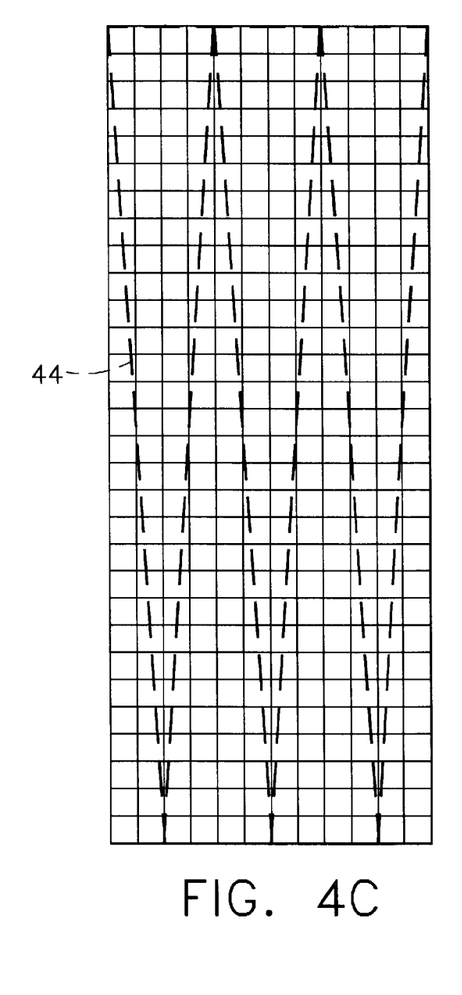
Figure 4D:
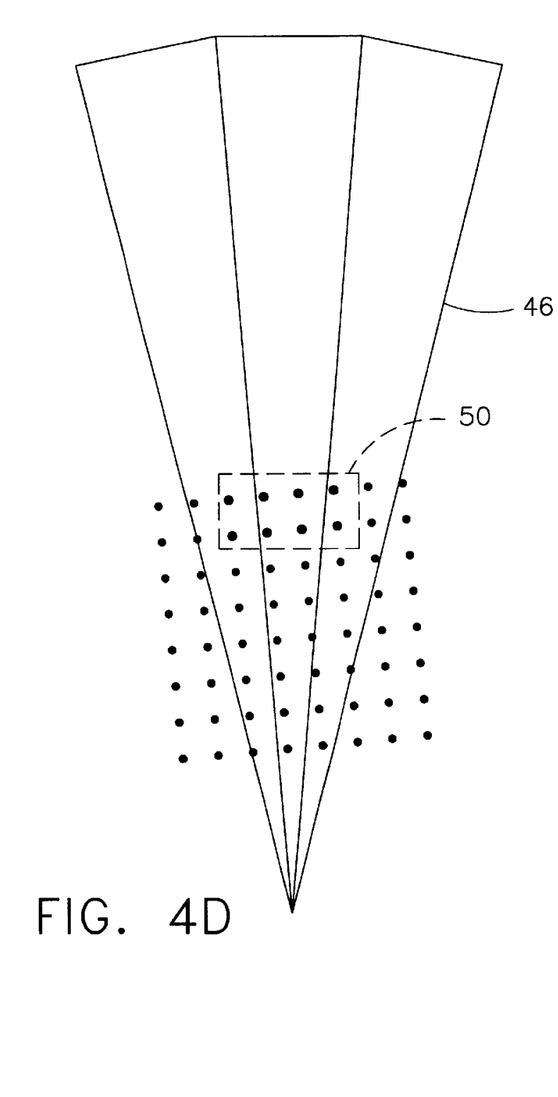
Figure 4E:
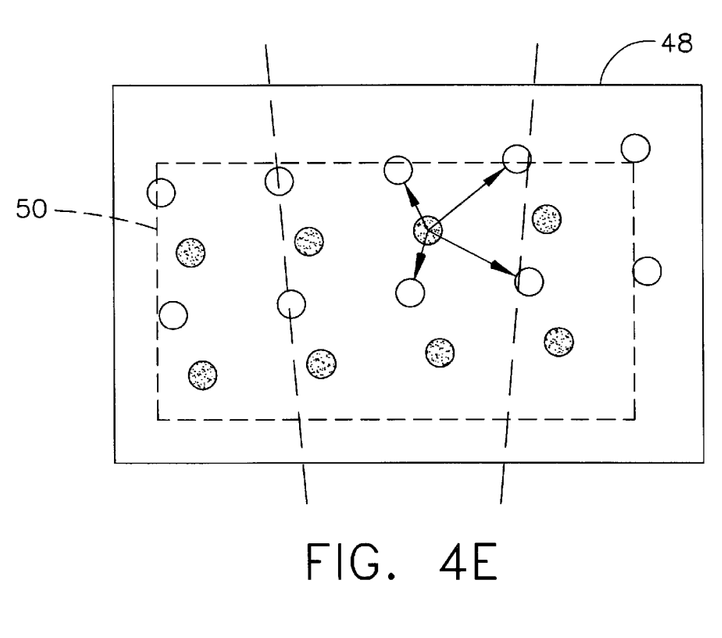
Figure 5:
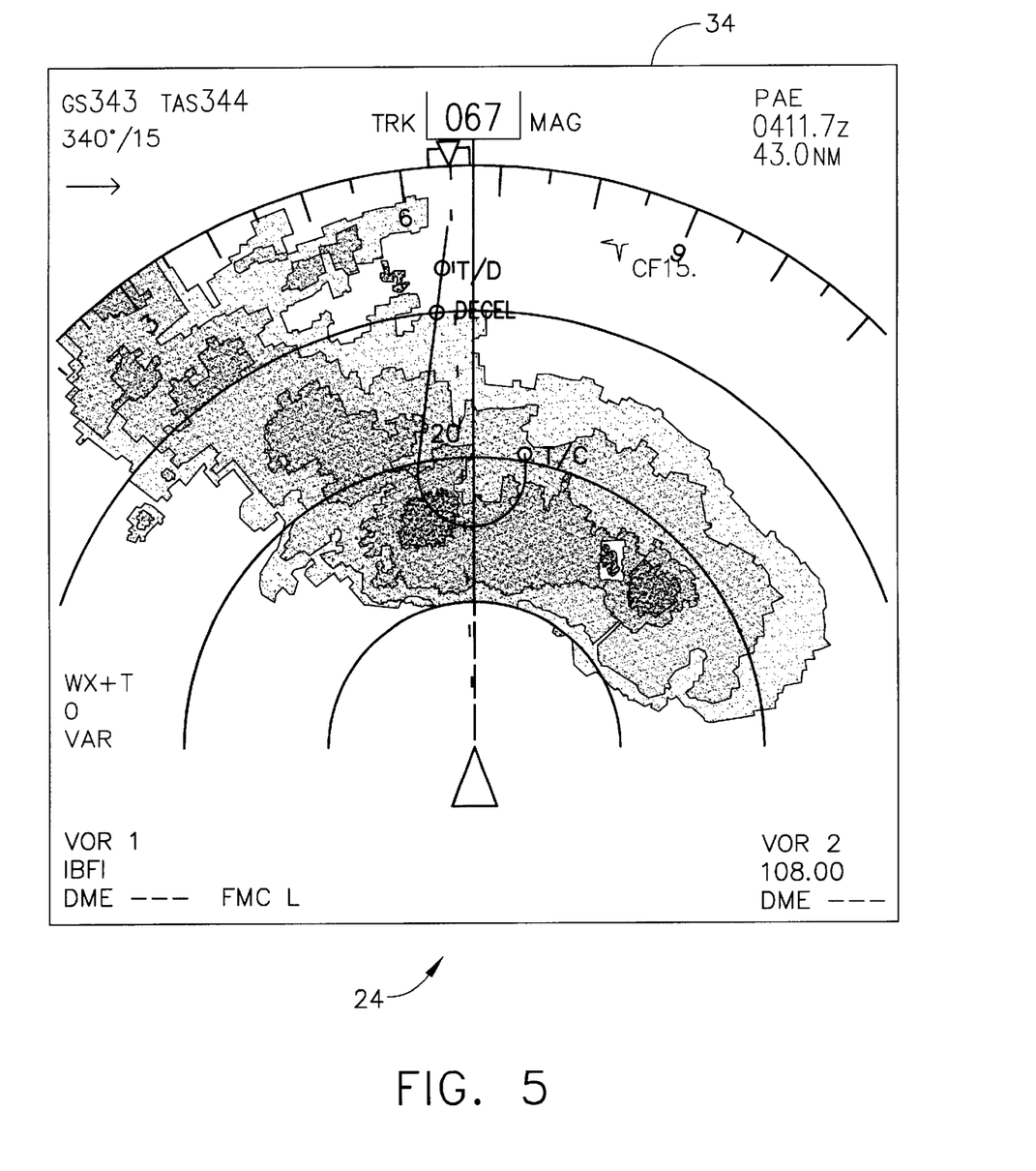
FIG. 5 illustrates a color radar display displaying exemplary radar data generated by a preferred embodiment of a radar display system according to the present invention.

Referring to FIGS. 4B–4C and FIG. 5 the rendering process will now be discussed. The processor 26 generates commands to the graphics renderer 18 that map the rectangular texture shown in FIG. 4B onto a series of display triangles that form the plan position indicator (pie shaped) display. The texture shown in FIG. 4B is a portion of the texture stored in the texture memory 20 in FIGS. 2–3. FIG. 5 is illustrative of the desired weather display, with additional symbology overlaid. FIG. 4D illustrates a portion of that hemisphere, segmented into the triangles. FIG. 4C shows the mapping of several of those triangles onto the texture store in texture memory 20. The commands generated by the processor 26 identify the position of the three corners of the triangle (shown in FIG. 4D) positioned in the frame buffer 22. The commands also identify the three points in the texture memory 20 to be mapped, as shown by the dotted triangle at 44 in FIG. 4C. Responding to these rendering commands, the graphics renderer 18 subsequently renders the display polygons by bit-mapping the position of each pixel within the display polygons to a corresponding position in the texture triangle in the rectangular textures. As a result, the texels at the bottom of FIG. 4C are effectively collapsed into just a few pixels, while the texels at the top are "fanned" out across the periphery of the plan position indicator display area (i.e., along the outer edge) of FIG. 5.

The graphics renderer 18 fills the specified triangle in the frame buffer 22 with color values (red, green, blue and alpha) based on the intensities in the texture memory 20 and the color palette according to texturing algorithms well known in the art. As shown at 48 in FIG. 4E, the graphics renderer 18 subsequently colors each of the pixels in the display polygons by performing a bi-linear interpolation of the indexed color from the four nearest texture pixels of the corresponding rectangular textures. As those skilled in the art understand, other known processes such as nearest neighbor calculating may be used for coloring the pixels. This process is repeated, mapping the successive triangles of FIG. 4D onto successive sections of the texture (shown in FIG. 4C) stored in texture memory 20. The series of polygons are positioned in accordance with the desired size of the display and are arranged in a fanwise manner to generate a planned position indicator display.

The number of display triangles is predetermined in accordance with the number of columns of texture (radials) that can be mapped onto one display triangle without significant distortion and also in accordance with the sharpness required for a curved image appearing on the radar display 24. In the current example, four radials are mapped onto one triangle; hence, the 120° pie shape is segmented into 128 triangles.

Radar return values for the area in proximity to the radar antenna outside of the triangles mapped onto texture memory will never be displayed. However, because these radar returns come from the same general area as portions inside of the triangle (as shown in FIG. 4A), the intensity values for these radar returns should be similar, hence any distortion in the image will be minor. The range bins represented by the dark areas at the bottom of the representative scan areas in FIGS. 4A–4C illustrate this effect.

FIG. 5 illustrates the display 24 displaying an exemplary output 34 (albeit in black and white format) of the radar display system 10 generated as discussed above with reference to FIGS. 4A–4E, where the different shades of gray represent different colors on the display 24.

In the above example, the radar data receiver 12 receives a set number (256) of radar returns (range bins) per predetermined radial angle for every radar scan. However, the radar data receiver 12 could possibly receive a variable number of radar returns for each radar angle or scan, the radial angles within which the radar returns are received could vary for each radar scan, or the radial angles within which the radar returns are received could vary due to, for example, aircraft yaw. In optional modifications, the processor 26 and the graphics renderer 18 of the radar display system 10 can accommodate the above events.

Specifically, in a first optional modification, the radar display system 10 may be designed to accommodate aircraft yaw. The system bus 16 would be in electronic communication with a yaw detector 28 of the aircraft navigational system. The yaw detector 28 would determine the direction of the aircraft (not shown) with respect to a direction of North as the aircraft changed direction. The processor 26 would receive the current direction of the aircraft and would add this angle to the radial angle (the angle between the aircraft and the antenna) associated with each range bin data set before writing the range bin data set in the texture memory 20. Therefore, the rectangular textures written in texture memory 20 would be written based upon a true angle of the radar antenna with respect to direction of North. The display system would then change the position of the texture that is mapped onto the center of the triangle fan dynamically to correspond to the current direction of the aircraft. The spacing between the radials in the north referenced texture will change as the aircraft yaws. As a result, the radials may have to be repeated as described below for variable radial angles.

In a second optional modification, the radar display system 10 may be designed to accommodate a variable number of radar returns (range bins) for each radar scan by providing texture memory for the maximum number of range bins, and filling the unused bins with an appropriate default intensity.

In a third optional modification, the radar display system 10 may be designed to accommodate different radial angles for the radar returns. Some radar antennas will provide the same set of angles for every scan, allowing the relationship between angle and the texture memory addresses to be pre-defined. In comparison, other radar antennas may produce slightly different angles between scans due to electronic tolerances in the scanning mechanism or significantly different angles due to the yaw compensation discussed above with respect to the first modification. Referring back to the examples in FIGS. 2 and 3, the x-axis of the texture memory 20, which corresponds to the angle associated with each radial, can be separated into different sections in accordance with the separate display triangles to be generated in order to accommodate the different angles. Spaces are left between sections. Variable numbers of radials are then stored in each section, and the coordinates of the display triangle are adjusted to accommodate the number of radials actually received within that section. This process may require the duplication of some radials, as the bi-linear interpolation performed by the graphics renderer may require a radial at the boundary of sections to be repeated as the "edge" radial of both sections. Radials may also be repeated within sections to ensure that there are no visible "spokes" or missing sections, even if the radar does skip an address in the texture memory 20.

It should be understood by those skilled in the art that the radar display system 10 of the present invention could be implemented in ways other than those discussed above without departing from the spirit or scope of the present invention. For example, the processor 26 could be eliminated and the WX receiver 12 could calculate the texture memory address for each radial.

Some graphics systems can write directly to texture memory, without having to store the data in the main memory 14. The WX receiver 12 could calculate the texture memory address for each radial and write the radial directly in the texture memory 20.

The graphics renderer 18 does not have to do the intensity-to-color look-up. The radar data receiver 12 or the radar system 10 could directly provide the color.

The radar display system 10 does not have to receive 256 range bins for each radial angle and the radar data receiver 12 does not have to receive 512 range bin data sets (radials). More radials can be utilized to increase the accuracy associated with each radial angle, or fewer radials can be utilized as long as the number of radials is high enough to generate sharp display images.

In addition, the graphics renderer 18 can optionally include an advanced graphics port (AGP) for providing high speed and direct electronic communication with the main memory 14.

The main memory 14 may optionally include a memory controller for controlling access to the main memory by the graphics renderer 18.

Further, the present invention can be used with a display system that uses a "unified memory" architecture, where the frame buffer 22, the texture memory 20 and optionally a portion of main memory 14 that contains rendering engine commands, can be combined into one physical memory. In addition, the WX receiver 12 can be configured to communicate with the processor 20 by means of a FIFO or a dual port memory.

Therefore, the present invention provides a radar display system for generating a radar display with a direct memory access receiver 12 for receiving radially scanned radar data from a radar antenna receiver 11 in, for example WX PD format or ARINC 708 format. The radar antenna receiver 11 converts the radially scanned radar data into range bin data sets and stores the range bin data sets in a memory 14. The processor 20 would calculate the angle of each of the range bin data sets if the angle of each of the range bin data sets was not received by the direct memory access receiver 12, controls the storage of the range bin data sets in a texture memory 20 as a rectangular texture based on the radial and an intensity of each of the range bin data sets and the graphics renderer 18 then bit maps the rectangular texture to a display triangle. The rectangular textures contain texture pixels that may be pointers to a plurality of palette registers 30 within the graphics renderer 18. A pixel in each of the series of display triangles corresponds to either a texture pixel in a corresponding rectangular texture to which each of the series of display triangles is mapped to a bi-linear interpolation of the color of the four nearest texture pixels to the display pixel. The pixel in each of the display triangles is colored in accordance with the texture pixel in the corresponding rectangular textures.

The processor 26 controls operation of the graphics renderer 18 and loads the range bin data sets into the graphics renderer 18. The graphics renderer 18 includes a plurality of palette registers, each of which contains a color value and an attenuation value.

Regardless of the details of its specific implementation, one skilled in the art should appreciate that the radar display system 10 of the present invention enables a radar display to be implemented within, for example, an aircraft navigational system environment in a cost effective manner, as the radar display system 10 may utilize hardware that is already part of commercially available general-purpose graphics engines rather than by more expensive system specific hardware components. Specifically, a radar image may be scaled, rotated, translated and displayed in multiple locations under software control without additional hardware. The only required computation is the computation required to correctly position the textured triangles. In addition, aircraft turn, or yaw, compensation is also executed by the processor 20 and graphics renderer 18 rather than in dedicated hardware as in conventional radar systems.

What is claimed is:

1. A radar display system comprising:
   a receiver for receiving radially scanned radar data in a defined format and for converting the radially scanned radar data into range bin data sets;
   means for writing the range bin data sets into a texture memory;
   a graphics renderer for texturing the range bin data sets and for generating a warped textured bit mapped image of the range bin data sets;
   a processor for controlling operation of the graphics renderer; and
   means for loading the range bin data sets from the main memory into the graphics renderer.

2. The radar display system of claim 1, wherein the graphics renderer is further for:
   writing each of the range bin data sets into a texture memory as a rectangular shaped texture based upon an angle from a defined plane of orientation and an order of an intensity value received in the range bin data set;
   specifying coordinates for each corner point of a polygon based on the rectangular shaped texture so as to map the rectangular shaped texture onto the polygon;
   rendering the polygon by taking a position of a pixel in the polygon, determining a corresponding position of a texture pixel in the rectangular shaped texture and coloring the pixel in the polygon in accordance with the texture pixel or texture pixels near to the position of the texture pixel in the rectangular shaped texture; and
   generating display output data based on the polygon.

3. The radar display system of claim 2, wherein the means for writing the range bin data sets into a texture memory further comprises writing the range bin data sets into a main memory and subsequently writing the range bin data sets into the texture memory.

4. The radar display system of claim 2, wherein the graphics renderer is further for coloring the pixel in the polygon in accordance with the texture pixel in the rectangular shaped texture by:
   determining a color of each of four closest texture pixels to the pixel in the polygon;
   performing a bi-linear interpolation of the color of each of the four closest texture pixels to determine a display pixel color; and
   coloring the pixel in the polygon with the display pixel color.

5. The radar display system of claim 2, wherein each of the texture pixels includes a pointer that points to a color palette register in which the color of the texture pixel is stored.

6. The radar display system of claim 2, wherein the defined plane of orientation is a sum of a first angle between the radar antenna and a radar reference plane and a second angle between a heading direction of the radar reference plane and an earth reference plane.

7. The radar display system of claim 1, wherein the defined format of the radially scanned radar data is WX PD format.

8. The radar display system of claim 1, wherein the defined format of the radially scanned radar data is ARINC 708 format.

9. The radar display system of claim 1, wherein each of the range bin data sets comprises a radial angle and a plurality of intensity values of radar returns for the radial angle.

10. The radar display system of claim 1, further comprising a memory controller for controlling access to the main memory by the graphics renderer.

11. A method of displaying radar information comprising:
    receiving radially scanned radar data in a defined format and converting the radially scanned radar data into range bin data sets, each of the range bin data sets including radial angles, and a plurality of intensity values for the radial angles;
    converting each of the range bin data sets into a rectangular texture and storing the rectangular texture in a texture memory according to the radial degrees and an order of the intensity value received for each of the range bin data sets;
    rendering the rectangular textures onto a polygon by bitmapping rectangular texture coordinates onto the polygon and coloring pixels of the polygon in accordance with colors indicated by corresponding texture pixels of the rectangular textures; and
    formatting the polygon into a pie shaped planned position indicator display output.

12. The method of claim 11, wherein the converting of each of the range bin data sets into the rectangular texture and the storing of the rectangular texture in the texture memory according to the radial angles and the order of the intensity value received for each of the range bin data sets further comprises storing the rectangular texture in the texture memory based upon a predetermined variance factor that is a vector flight direction with respect to a reference horizon.

13. The method of claim 11, wherein the converting of each of the range bin data sets into the rectangular texture and the storing of the rectangular texture in the texture memory according to the radial angles and the order of the intensity value received for each of the range bin data sets further comprises storing the rectangular texture in the texture memory according to the intensity value that is selected from a group consisting of weather, distance between a radar antenna and a surface of the Earth, and distance between the radar antenna and another moving object.

14. A radar display system for generating a radar display comprising:
    a direct memory access receiver for receiving radially scanned radar data from a radar antenna receiver, for converting the radially scanned radar data into range bin data sets and for storing the range bin data sets in a texture memory;
    a graphics renderer for storing the range bin data sets in the texture memory as a rectangular texture based on a radial angle and an order of an intensity value received for each of the range bin data sets and for bit mapping the rectangular texture to a display triangle; and
    a processor for controlling operation of the graphics renderer, loading the range bin data sets into the graphics renderer, and calculating the radial angle of each of the range bin data sets if the radial angle of each of the range bin data sets was not received by the direct memory access receiver.

15. The radar display system of claim 14, wherein the graphics renderer includes a plurality of palette registers, each of which contains a color value and an attenuation value.

16. The radar display system of claim 15, wherein the rectangular textures contain texture pixels that are pointers to the plurality of palette registers.

17. The radar display system of claim 16, wherein a pixel in each of the series of display triangles corresponds to a texture pixel in a corresponding rectangular texture to which each of the series of display triangles is bit mapped, and the pixel in each of the display triangles is colored in accordance with the texture pixel in the corresponding rectangular textures.

18. The radar display system of claim 14, wherein the graphics renderer further is for storing each of the range bin data sets in the texture memory as the rectangular textures based on the radial angle, the order of the intensity values of each of the range bin data sets, a first angle between a radar antenna and a radar reference plane and a second angle between a heading direction of the radar reference plane and an earth reference plane.

19. The radar display system of claim 14, wherein the defined format is WX PD format.

20. The radar display system of claim 14, wherein the defined format is ARINC 708.

* * * * *